2,823,164

METHOD OF PREPARING 3,5,3' L-TRI-IODO-THYRONINE AND PHARMACEUTICAL COMPOSITIONS THEREOF

Rosalind Pitt-Rivers, London, England, and Jack Gross, Brooklyn, N. Y., assignors to National Research Development Corporation, London, England, a British company No Drawing. Application February 25, 1953
Serial No. 338,914

9 Claims. (Cl. 167—65)

The present invention relates to the pharmacologically active form of tri-iodo thyronine, -3,5,3'-L-tri-iodo thyronine- a calorigenic agent useful in the treatment and control of body disorders associated with an impairment of the thyroid hormone function.

An object of the invention is the production of an optically active pharmacologically active iodinated thyronine, -3,5,3'-L-tri-iodo thyronine suitable as a calorigenic agent useful in the treatment and control of body disorders associated with an impairment of the thyroid hormone function.

A further object of the invention is to provide optically pure -3,5,3'-L-tri-iodo thyronine- substantially free from the D-form and from thyroxine and of clinical utility as a replacement for thyroid extract in the prevention of goitre and of particular utility for the treatment of disorders associated with low metabolic levels where the individual, cumulative, or where the associative symptomatic response to thyroid extract or thyroxine is contra-indicated due to the high iodine content of these latter.

According to the invention, -3,5,3'-L-tri-iodo thyronine, and its pharmaceutically active salts may be associated with a carrier which may be either a solid material or a sterile parenteral liquid. The pharmaceutically active salts are the mono- and di-alkali metal salts, such as the salts of sodium and potassium, and the ammonium and the lower alkyl ammonium salts of the L-form of the tri-iodo thyronine. The compositions may take the form of tablets, powders, capsules or other dosage forms useful for oral ingestion. Liquid diluents in sterile condition may be used for parenteral use (by injection). In the dry form of the L-tri-iodo thyronine, solid diluents such as cornstarch, lactose, talc, gums, stearic acid, magnesium stearate and the like may be used, or the material may be tabletted without adjuvants. A capsule of resorbable material, such as gelatine, may be employed. The material may be in the form of a suspension in an inert liquid in which it is not soluble.

The thyroid gland contains a red-staining colloid material in which is stored the protein thyroglobulin. Thyroglobulin is specific to the thyroid and contains the active principle of the gland; after enzymic or chemical hydrolysis it yields four crystalline iodinated amino-acids: 3-iodotyrosine, 3:5-diiodotyrosine, thyroxine and 3:5:3'-triiodothyronine (see the formulae, infra). Mono- and di-iodotyrosine show none of the characteristic physiological activity of the thyroid gland in man. All this activity is contained in thyroxine and triiodothyronine. The thyroxine content of thyroid material accounts for about one-half of the total iodine. The triiodothyronine content is exceedingly small and its isolation is not a practical proposition.

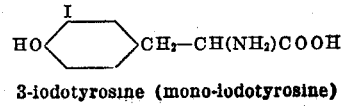

3-iodotyrosine (mono-iodotyrosine)

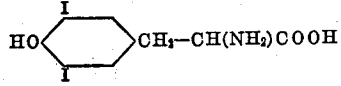

3:5-diiodotyrosine

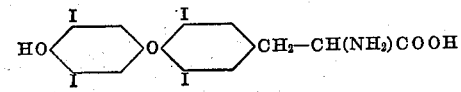

Thyroxine

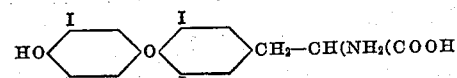

3:5:3'-triiodothyronine

The activity of desiccated thyroid gland preparations is proportional to the thyroxine and tri-iodothyronine content of the preparations. Pure thyroxine possesses about 320 times the activity of dried thyroid, based on the iodine content; the preparation of dried gland (U. S. P.) contains 0.17 to 0.23 percent of iodine, while in the British Pharmacopoeia the dosage of thyroxine is estimated as acid-insoluble iodine which must be 0.1% ($\pm$0.01%).

Crystalline thyroxine is suitable for intravenous administration whereas desiccated thyroid may not be so administered. Crystalline thyroxine sodium is also suitable for oral administration.

Naturally occurring thyroxine is L-thyroxine and this form is considerably more active than D-thyroxine. Pitt-Rivers and Lerman (1948) Journal of Endocrinology, volume 5, page 223, have shown that L-thyroxine is 8 to 10 times more active than D-thyroxine in restoring the basal metabolic rate in myxoedema patients to normal levels.

Naturally occurring tri-iodothyronine is L-tri-iodo-thyronine. The L- and D-isomers have been synthesised, and it has been shown that the D-isomer only possesses about 7% of the activity of the L-isomer in the goitre prevention test in rats. DL-tri-iodo-thyronine prepared by the method of Roche, Lissitzky and Michel (1952) C. R. Acad. Sci., Paris, 234, 997, only possesses about one-half of the activity of the L-isomer, in the same biological assay.

L-tri-iodothyronine has also been shown to possess about 5 times the activity of L-thyroxine in the goitre prevention assay in rats and an increased activity of the same order in restoring the basal metabolic rates and blood cholesterol levels of myxoedema patients to normal values.

The preparation of 3,5,3'-L-tri-iodothyronine is shown in the following examples, starting from 3,5 L-di-iodo thyronine. 3,5 di-iodo compound is a known material and may be prepared by the method in British Patents Nos. 643,089 and 671,070 and in the Journal of the Chemical Society, London, 1949, page 3424.

Example 1

*Synthesis.*—L-di-iodo thyronine (1.05 g.) is dissolved in ammonia (specific gravity 0.880) (40 ml.) and methanol (40 ml.) and iodinated slowly with shaking with N-iodine in KI solution at room temperature. After iodination, most of the ammonia and methanol are removed by evaporation under diminished pressure, water is added to the original volume, the solution is heated to 60° C. and brought to pH 4 with hydrochloric acid. A crystalline precipitate is obtained which after cooling to room temperature is collected and washed with water. At this stage, the crude tri-iodo thyronine is contaminated with thyroxine and a little unchanged di-iodo thyronine.

*Purification.*—The crude precipitate is dissolved in boiling 2 N-HCl (300 ml.) and filtered from the relatively insoluble thyroxine hydrochloride. The hot filtrate is brought to pH 4 with 5 n-NaOH and tri-iodo thyronine again separates; after chilling at 0–4° C. it is collected, washed with water and dried. The yield of tri-iodo thyronine is 70–75% of the theoretical. This tri-iodo thyronine still contains some thyroxine (about 10%).

The final purification consists in chromatographic separation of thyroxine and tri-iodo thyronine on a kieselguhr column using 20% chloroform in n-butanol equilibrated with 0.5 n-NaOH as the developing solvent. 80–100 mg. tri-iodo thyronine is purified during each run on a 50 g. kieselguhr column. Pure L-tri-iodo thyronine has M. P. 236–7° C. (decomp.) $[\alpha]_D^{29.5°} = +21.5$ in a 4.75% solution in a mixture of 1 part of N-HCl and 2 parts of ethanol.

Example 2

L-tri-iodo thyronine is also prepared from L-di-iodo thyronine by iodinating in 33% aqueous ethylamine and working up as in Example 1 above (yield 75–80%), or by iodinating in N-NaOH solution at pH 14 (yield 70–75%). However where the iodination is carried out in carbonate-bicarbonate solution at pH 9–10, the yield is reduced to 45% owing to the formation of larger amounts of thyroxine.

Example 3

DL-tri-iodo thyronine and D-tri-iodo thyronine are also prepared by the methods of Example 1 and Example 2 above, starting from the corresponding DL-di-iodo thyronine and D-di-iodo thyronine, these starting materials prepared by the method of British Patents Nos. 643,089 and 671,070, and Journal of the Chemical Society, London, 1949, page 3424.

The relative activities of L, DL and D tri-iodo thyronine, prepared and purified as above, each of the L and D forms being substantially free from the D and L forms as impurities, respectively tested by the goitre prevention assay test method, using rats, are indicated as follows:

(1) The activity of D-tri-iodo thyronine is about 7% of that of the activity of the L-tri-iodo thyronine.

(2) The activity of the DL-tri-iodo thyronine is about 59% of the activity of the L-tri-iodo thyronine.

(3) The activity of the L-tri-iodo thyronine is several times greater than that of L-thyroxine.

Having thus disclosed the invention, what is claimed is:

1. The method of manufacturing 3,5,3'-L-tri-iodo-thyronine substantially free from D-form which comprises the steps of iodinating 3,5-L-di-iodo-thyronine in an alkaline medium to form 3,5,3'-L-tri-iodo-thyronine contaminated with thyroxine, acidifying said mixture to bring the pH thereof to about 4 to form a precipitate, recovering the precipitate, redissolving the precipitate in boiling hydrochloric acid of approximately 2N concentration, filtering the solution to remove therefrom insoluble thyroxine hydrochloride, adjusting the filtrate to the pH of about 4 to precipitate the 3,5,3'-L-tri-iodo-thyronine, and separating the precipitate from the solution.

2. The method according to claim 1, the iodination being effected by means of iodine dissolved in potassium iodide solution.

3. The method according to claim 1, wherein the 3,5,3'-L-tri-iodo-thyronine is further purified by chromatographic separation on a kieselguhr column by means of a 20% solution of chloroform in n-butanol equilibrated with 0.5 N sodium hydroxide solution as the developing solution.

4. A composition for the treatment of body disorders associated with an impairment of a thyroid hormone function comprising a thyronine derivative having the basic structural formula of 3,5,3'-L-tri-iodo-thyronine, and a pharmaceutical carrier selected from the group consisting of tablets, powders, capsules and sterile parenterial liquids.

5. The composition of claim 4 in which said carrier is a tablet.

6. The composition of claim 4 in which said carrier is a sterile parenteral liquid pharmaceutical carrier.

7. The composition of claim 4 in which said carrier is a powder.

8. The composition of claim 4 in which said carrier is a capsule.

9. A composition for the treatment of body disorders associated with an impairment of a thyroid hormone function comprising a thyronine derivative consisting essentially of a member selected from the group consisting of 3,5,3'-L-tri-iodo-thyronine and the therapeutically active salts thereof, and a pharmaceutical carrier selected from the group consisting of tablets, powders, capsules, and sterile parenteral liquids.

References Cited in the file of this patent

FOREIGN PATENTS 652,207  Great Britain _____ Apr. 18, 1951

OTHER REFERENCES

Gross: Lancet, vol. 262, March 1, 1952, pp. 439–441.

Roche: Acad. Sci. Comp. Rendus, vol. 234, January–March 1952, pp. 997, 998.

Kleiner: Human Biochem., 3rd ed., 1951, Mosby Co., St. Louis, Mo., page 104.

Gross: Lancet, vol. 261, July–December 1951, pp. 776 and 767.

Hird: The Australian J. of Sci., col. 10, pp. 185–187.